(12) United States Patent
Li et al.

(10) Patent No.: US 9,510,304 B2
(45) Date of Patent: Nov. 29, 2016

(54) METHOD AND APPARATUS FOR IMPLEMENTING PRIMARY SYNCHRONIZATION SIGNAL IN TIME DOMAIN AND COMPUTER STORAGE MEDIUM

(71) Applicant: ZTE Corporation, Shenzhen (CN)

(72) Inventors: Bin Li, Shenzhen (CN); Caihong Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/029,951

(22) PCT Filed: Jun. 17, 2014

(86) PCT No.: PCT/CN2014/080091
§ 371 (c)(1),
(2) Date: Apr. 15, 2016

(87) PCT Pub. No.: WO2015/058539
PCT Pub. Date: Apr. 30, 2015

(65) Prior Publication Data
US 2016/0234793 A1    Aug. 11, 2016

(30) Foreign Application Priority Data

Oct. 23, 2013   (CN) .......................... 2013 1 0505097

(51) Int. Cl.
*H04W 24/00* (2009.01)
*H04W 80/04* (2009.01)
(Continued)

(52) U.S. Cl.
CPC .......... *H04W 52/36* (2013.01); *H04L 27/2613* (2013.01); *H04L 27/2628* (2013.01); *H04L 27/2692* (2013.01); *H04W 56/00* (2013.01); *H04J 2211/005* (2013.01)

(58) Field of Classification Search
CPC ... H04W 80/04; H04W 88/16; H04W 72/04; H04W 24/00; H04W 56/00; H04B 7/212; H04L 29/06163
See application file for complete search history.

(56) References Cited

U.S. PATENT DOCUMENTS

2009/0135804 A1* 5/2009 Swarts .............. H04W 56/0085
                                                            370/350
2011/0007704 A1* 1/2011 Swarts ................ H04J 11/0073
                                                            370/330
(Continued)

FOREIGN PATENT DOCUMENTS

| CN | 101651650 A | 2/2010 |
| CN | 102202026 A | 9/2011 |
| CN | 102421114 A | 4/2012 |

OTHER PUBLICATIONS

International Search Report in international application No. PCT/CN2014/080091, mailed on Sep. 2, 2014.
(Continued)

*Primary Examiner* — Andrew Lee
(74) *Attorney, Agent, or Firm* — Oppedahl Patent Law Firm LLC (57) ABSTRACT

Disclosed is a method for implementing a Primary Synchronization Signal (PSS) in the time domain, including that: PSS time domain sequences with different sampling rates and with configuration represented by $N_{ID}^{(2)}$ are pre-stored; a PSS time domain power weighting related parameter is obtained according to a PSS power control related parameter, a cell related parameter and timing information; power weighting processing is performed on the PSS time domain sequences to obtain weighted PSS time domain sequences according to the pre-stored PSS time domain sequences with different sampling rates and with configuration represented by $N_{ID}^{(2)}$ and the PSS time domain power weighting related parameter; and addition operation is performed on the weighted PSS time domain sequences and time domain data of signals and channels other than the PSS. Also disclosed are an apparatus for implementing a PSS in the time domain and a computer storage medium.

11 Claims, 3 Drawing Sheets

(51) Int. Cl.
*H04W 52/36* (2009.01)
*H04L 27/26* (2006.01)
*H04W 56/00* (2009.01)

(56) References Cited

U.S. PATENT DOCUMENTS

| | | | | |
|---|---|---|---|---|
| 2011/0274026 A1* | 11/2011 | Huang | .................. | H04J 11/0069 370/312 |
| 2011/0280189 A1* | 11/2011 | Tsuboi | ................ | H04L 27/2621 370/328 |
| 2013/0176952 A1* | 7/2013 | Shin | ........................ | H04L 5/001 370/329 |
| 2014/0321450 A1* | 10/2014 | Zhang | .................. | H04L 7/0016 370/350 |
| 2014/0334478 A1* | 11/2014 | Cheng | .................... | H04L 27/261 370/350 |
| 2015/0049704 A1* | 2/2015 | Park | ...................... | H04L 5/0048 370/329 |
| 2015/0327224 A1* | 11/2015 | Guan | .................... | H04L 5/0053 370/329 |
| 2016/0013984 A1* | 1/2016 | Sun | ........................ | H04W 24/08 370/252 |

OTHER PUBLICATIONS

English Translation of the Written Opinion of the International Search Authority in international application No. PCT/CN20141080091, mailed on Sep. 2, 2014.

* cited by examiner

METHOD AND APPARATUS FOR IMPLEMENTING PRIMARY SYNCHRONIZATION SIGNAL IN TIME DOMAIN AND COMPUTER STORAGE MEDIUM

TECHNICAL FIELD

The disclosure relates to a downlink physical layer processing technology and in particular to a method and an apparatus for implementing a Primary Synchronization Signal (PSS) in the time domain and a computer storage medium.

BACKGROUND

In the wireless communications, a wireless communication system based on a Fourth Generation (4G) protocol standard-Long Term Evolution (LTE) is applied more and more widely. An LTE protocol standard absorbs and adopts good proposals from numerous mainstream wireless communication equipment manufacturers, and thus the LTE protocol standard may be considered as a set of the good proposals. As a basis of an LTE system design, the LTE protocol defines each aspect of an LTE system in more detail, certainly including LTE downlink physical layer processing. In particular, generation and mapping rules of an LTE PSS are described in the LTE protocol standard in detail.

For description about the PSS physical layer processing, the LTE protocol mainly includes description about a PSS generation rule and a PSS mapping rule in the LTE.

Specifically, the LTE physical layer protocol makes a definition shown in formula (1) for the PSS generation rule:

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad (1)$$

where a value range of $N_{ID}^{(2)}$ is $\{0, 1, 2\}$, a value of u is 25 when a value of $N_{ID}^{(2)}$ is 0, the value of u is 29 when the value of $N_{ID}^{(2)}$ is 1, and the value of u is 34 when the value of $N_{ID}^{(2)}$ is 2.

In formula (1), $d_u^{(n)}$ corresponds to a PSS sequence. It can be known from the value range of n that n corresponds to 62 Resource Element (RE) sampling points. According to a value of u, it can be known that a value of the PSS sequence is only related to $N_{ID}^{(2)}$, and the value range of $N_{ID}^{(2)}$ is $\{0, 1, 2\}$. As can be seen from the above, there are three different PSS sequences according to three different values of $N_{ID}^{(2)}$ respectively, and each sequence corresponds to 62 RE sampling points.

The LTE physical layer protocol makes a definition shown in formula (2) for the PSS mapping rule:

$$a_{k,l} = d(n), n = 0, \ldots, 61 \quad (2)$$
$$k = n - 31 + \frac{N_{RB}^{DL} N_{sc}^{RB}}{2}.$$

For frame structure type 1, a PSS is mapped onto the last Orthogonal Frequency Division Multiplexing (OFDM) symbols in timeslot 0 and timeslot 10. For frame structure type 2, the PSS is mapped onto the third OFDM symbols in subframe 1 and subframe 6. The following RE sampling points $$k = n - 31 + \frac{N_{RB}^{DL} N_{sc}^{RB}}{2}, n = -5, -4, \ldots, -1, 62, 63, \ldots 66,$$

are configured to reserve REs and not transmit the PSS, that is, a mapping value of the REs is "0".

Figure 1:
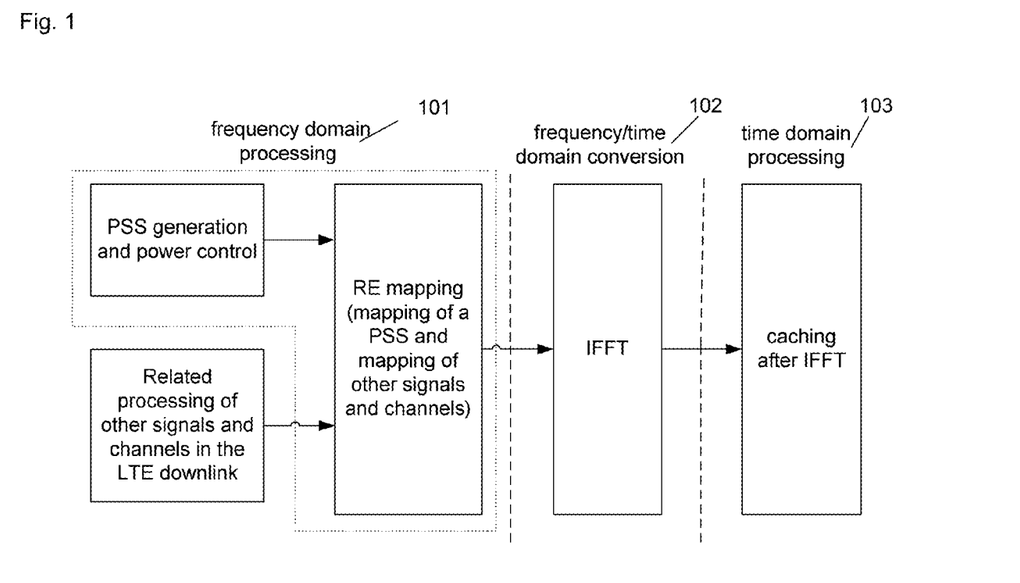
FIG. 1 is a block diagram illustrating implementation of a PSS in the frequency domain.

The LTE physical layer protocol makes the definitions about the PSS on the basis of implementation of the PSS in the frequency domain, and with reference to the abovementioned definitions, a flow of implementing the PSS in the frequency domain, as shown in FIG. 1, includes Step 101 of: frequency domain processing including PSS generation and power control and RE mapping, specifically mapping of the PSS and mapping of other signals and channels; Step 102 of: frequency/time domain conversion, specifically Inverse Fast Fourier Transform (IFFT); and Step 103 of: time domain processing, specifically sequent caching of the IFFT.

If a PSS is implemented in the frequency domain according to the definitions of the LTE physical layer protocol, since RE mapping in the frequency domain is a process of mapping RE sampling points in series, certain time overhead may be generated during RE mapping in the frequency domain, and thus the time consumed by LTE downlink physical layer processing may further be prolonged. Therefore, how to improve processing efficiency of an LTE downlink physical layer link becomes a problem urgent to be solved.

SUMMARY

In order to solve the existing technical problem, the embodiments of the disclosure provide a method and an apparatus for implementing a PSS in the time domain and a computer storage medium, which can improve processing efficiency of an LTE downlink physical layer link on the premise of ensuring completing all of the PSS related functions.

The technical solutions of the embodiments of the disclosure are implemented as follows:

The embodiments of the disclosure provide a method for implementing a PSS in the time domain, wherein PSS time domain sequences with different sampling rates and different $N_{ID}^{(2)}$ configurations are pre-stored, and the method further includes that:

a PSS time domain power weighting related parameter is obtained according to a PSS power control related parameter, a cell related parameter and timing information;

power weighting processing is performed on the pre-stored PSS time domain sequences with different sampling rates and different $N_{ID}^{(2)}$ configurations to obtain weighted PSS time domain sequences according to the pre-stored PSS time domain sequences with different sampling rates and different $N_{ID}^{(2)}$ configurations and the PSS time domain power weighting related parameter; and addition operation is performed on the weighted PSS time domain sequences and time domain data of signals and channels except the PSS to obtain processed time domain data.

Preferably, the step that the PSS time domain sequences with different sampling rates and different $N_{ID}^{(2)}$ configurations may be implemented as follows:

PSS frequency domain sequences with different $N_{ID}^{(2)}$ configurations are obtained in advance, and IFFT processing on the PSS frequency domain sequences is performed in different sampling rates to obtain and store the PSS time domain sequences with different sampling rates and different $N_{ID}^{(2)}$ configurations.

Preferably, the PSS frequency domain sequences with different $N_{ID}^{(2)}$ configurations are obtained in advance, wherein a PSS generation formula in an LTE physical layer protocol meets the following expression:

$$d_u(n) = \begin{cases} e^{-j\frac{\pi un(n+1)}{63}} & n = 0, 1, \ldots, 30 \\ e^{-j\frac{\pi u(n+1)(n+2)}{63}} & n = 31, 32, \ldots, 61 \end{cases},$$

where a value of $N_{ID}^{(2)}$ is selected from $\{0, 1, 2\}$, a value of u is 25 when a value of $N_{ID}^{(2)}$ is 0, the value of u is 29 when the value of $N_{ID}^{(2)}$ is 1, and the value of u is 34 when the value of $N_{ID}^{(2)}$ is 2; or, the PSS frequency domain sequences are obtained by adopting a PSS frequency domain sequence generation formula which does not exclude a direct current component corresponding to a zero frequency, wherein the PSS frequency domain sequence generation formula which does not exclude the direct current component corresponding to the zero frequency meets the following expression:

$$d_u(n) = e^{-j\frac{\pi un(n+1)}{63}} \quad n = 0, 1, 2, \ldots, 31, \ldots, 62,$$

where the value of $N_{ID}^{(2)}$ is selected from $\{0, 1, 2\}$, the value of u is 25 when the value of $N_{ID}^{(2)}$ is 0, the value of u is 29 when the value of $N_{ID}^{(2)}$ is 1, and the value of u is 34 when the value of $N_{ID}^{(2)}$ is 2.

Preferably, the PSS time domain power weighting related parameter may include: cell reference signal power, power offset of the PSS relative to a cell reference signal, a time domain cell broadcasting weight or a Cyclic Delay Diversity (CDD) weight and a time domain Antenna Calibration (AC) related weight.

The embodiment of the disclosure further provides an apparatus for implementing a PSS in the time domain, which may include a power weighting module and at least one PSS time domain data processing module, wherein the power weighting module may be configured to obtain a PSS time domain power weighting related parameter according to a PSS power control related parameter, a cell related parameter and timing information, and send the PSS time domain power weighting related parameter to the at least one PSS time domain data processing module; and the at least one PSS time domain data processing module may be configured to pre-store PSS time domain sequences with different sampling rates and different $N_{ID}^{(2)}$ configurations, perform power weighting processing on the PSS time domain sequences to obtain weighted PSS time domain sequences according to the pre-stored PSS time domain sequences with different sampling rates and different $N_{ID}^{(2)}$ configurations and the PSS time domain power weighting related parameter, and perform addition operation on the weighted PSS time domain sequences and time domain data of signals and channels except the PSS to obtain processed time domain data.

Preferably, the apparatus may further include an n-path IFFT processing module and a data caching module, wherein the n-path IFFT processing module may be configured to obtain the time domain data of the other signals and channels except the PSS, and send the time domain data of the other signals to the at least one PSS time domain data processing module; and the data caching module may be configured to receive the processed time domain data sent by the at least one PSS time domain data processing module, and cache the processed time domain data by taking a symbol as a unit.

Preferably, the data caching module may be a Random Access Memory (RAM).

Preferably, the PSS time domain power weighting related parameter may include: cell reference signal power, power offset of the PSS relative to a cell reference signal, a time domain cell broadcasting weight or a CDD weight and a time domain AC related weight.

The embodiment of the disclosure further provides a computer storage medium having computer-executable instructions stored therein, wherein the computer-executable instructions are configured to execute the method for implementing the PSS in the time domain in the embodiment of the disclosure.

According to the method and apparatus for implementing the PSS in the time domain provided by the embodiment of the disclosure, the PSS time domain sequences with different sampling rates and different $N_{ID}^{(2)}$ configurations are pre-stored; the PSS time domain power weighting related parameter is obtained according to the PSS power control related parameter, the cell related parameter and the timing information; power weighting processing is performed on the PSS time domain sequences to obtain the weighted PSS time domain sequences according to the pre-stored PSS time domain sequences with different sampling rates and different $N_{ID}^{(2)}$ configurations; and addition operation is performed on the weighted PSS time domain sequences and the time domain data of the other signals and channels except the PSS to obtain the processed time domain data. In such a manner, frequency/time domain conversion of a symbol which finishes frequency domain RE mapping of the PSS and mapping of the other signals and channels may be implemented by IFFT processing to further obtain time domain data corresponding to the symbol; and RE mapping and IFFT processing are performed on the PSS and the data of the other signals and channels except the PSS to obtain two sets of time domain data respectively, addition operation is performed on the two obtained sets of time domain data respectively, and the two approaches for implementing RE mapping and frequency/time domain conversion of a specified symbol are equivalent. Therefore, the embodiments of the disclosure avoid time overhead generated by frequency domain PSS RE mapping on the premise of ensuring realizing all of the PSS related functions, and further remarkably improve processing efficiency of an LTE downlink physical layer link.

DETAILED DESCRIPTION

A basic idea of the embodiments of the disclosure is that: PSS time domain sequences with different sampling rates and different $N_{ID}^{(2)}$ configurations are pre-stored; a PSS time domain power weighting related parameter is obtained according to a PSS power control related parameter, a cell related parameter and timing information; power weighting processing is performed on the PSS time domain sequences to obtain weighted PSS time domain sequences according to the pre-stored PSS time domain sequences with different sampling rates and different $N_{ID}^{(2)}$ configurations and the PSS time domain power weighting related parameter; and addition operation is performed on the weighted PSS time domain sequences and time domain data of other signals and channels except the PSS to obtain processed time domain data.

Herein, the PSS time domain power weighting related parameter includes: cell reference signal power, power offset of the PSS relative to a cell reference signal, a time domain cell broadcasting weight or a CDD weight and a time domain AC related weight.

The disclosure will be further described below with reference to the drawings and specific embodiments in detail.

Figure 2:
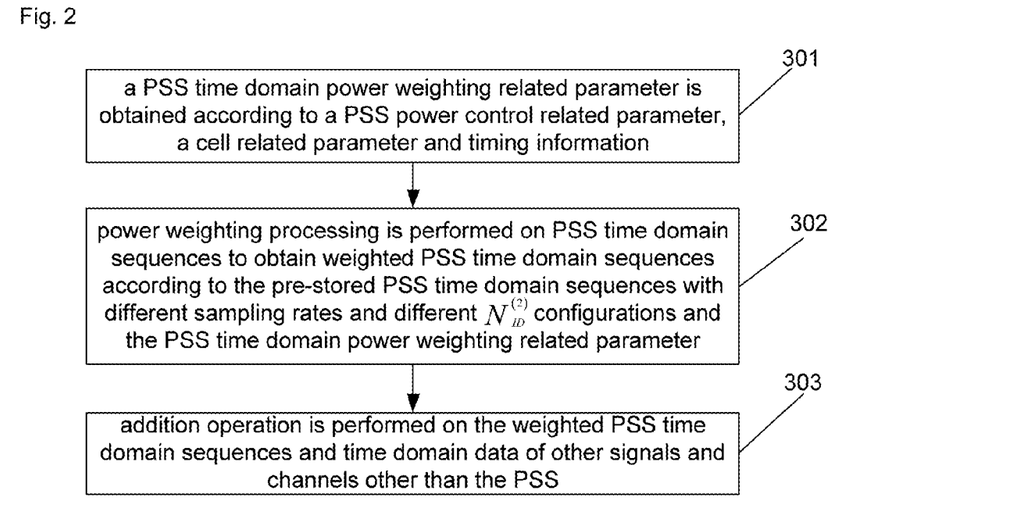
FIG. 2 is a flowchart showing a basic method for implementing a PSS in the time domain according to an embodiment of the disclosure.

FIG. 2 is a flowchart showing a basic method for implementing a PSS in the time domain according to an embodiment of the disclosure. As shown in FIG. 2, a flow of the basic method for implementing the PSS in the time domain according to the embodiment of the disclosure includes the following steps.

At Step 301, a PSS time domain power weighting related parameter is obtained according to a PSS power control related parameter, a cell related parameter and timing information.

Here, before the PSS time domain power weighting related parameter is obtained according to the PSS power control related parameter, the cell related parameter and the timing information, the method further includes that:

PSS time domain sequences with different sampling rates and different $N_{ID}^{(2)}$ configurations are pre-stored.

Here, the step that the PSS time domain sequences with different sampling rates and different $N_{ID}^{(2)}$ configurations specifically includes that:

PSS frequency domain sequences with different $N_{ID}^{(2)}$ configurations are obtained in advance, and IFFT processing on the PSS frequency domain sequences is performed with different sampling rates to further obtain the PSS time domain sequences with different sampling rates and different $N_{ID}^{(2)}$ configurations.

Here, IFFT processing on the PSS frequency domain sequences may be performed with different sampling rates by using a conventional art, and thus it will not be elaborated.

The step that the PSS frequency domain sequences with different $N_{ID}^{(2)}$ configurations are obtained in advance is specifically implemented as follows:

the PSS frequency domain sequences are obtained by adopting a PSS generation formula of an LTE physical layer protocol, wherein the PSS generation formula of the LTE physical layer protocol meets the following expression:

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases},$$

where a value range of $N_{ID}^{(2)}$ is $\{0, 1, 2\}$, a value of u is 25 when a value of $N_{ID}^{(2)}$ is 0, the value of u is 29 when the value of $N_{ID}^{(2)}$ is 1, and the value of u is 34 when the value of $N_{ID}^{(2)}$ is 2.

Alternatively, the PSS frequency domain sequences are obtained by adopting a PSS frequency domain sequence generation formula which does not exclude a direct current component corresponding to a zero frequency, wherein the PSS frequency domain sequence generation formula which does not exclude the direct current component corresponding to the zero frequency meets the following expression:

$$d_u(n) = e^{-j\frac{\pi u n(n+1)}{63}} \quad n = 0, 1, 2, \ldots, 31, \ldots, 62,$$

where the value range of $N_{ID}^{(2)}$ is $\{0, 1, 2\}$, the value of u is 25 when the value of $N_{ID}^{(2)}$ is 0, the value of u is 29 when the value of $N_{ID}^{(2)}$ is 1, and the value of u is 34 when the value of $N_{ID}^{(2)}$ is 2.

Here, since a PSS sequence generation rule of the LTE physical layer protocol does not include the direct current component corresponding to the zero frequency of an LTE frequency spectrum, i.e. the following sampling point:

$$d_u(n) = e^{-j\frac{\pi u n(n+1)}{63}} n = 31.$$

It is confirmed by algorithm simulation that influence of addition of the direct current component corresponding to the zero frequency to the PSS frequency domain sequences on performance of the PSS is slight and almost negligible, so that the corresponding PSS sequence generation formula may also be optimized into formula:

$$d_u(n) = e^{-j\frac{\pi u n(n+1)}{63}} \quad n = 0, 1, 2, \ldots, 31, \ldots, 62$$

when the direct current component corresponding to the zero frequency is added, that is, when a sampling point under the condition of n=31 is added into the PSS generation formula of the LTE physical layer protocol.

At Step 302, power weighting processing is performed on the PSS time domain sequences to obtain weighted PSS time domain sequences according to the pre-stored PSS time domain sequences with different sampling rates and different $N_{ID}^{(2)}$ configurations and the PSS time domain power weighting related parameter.

Here, the PSS time domain power weighting related parameter includes: cell reference signal power, power offset of the PSS relative to a cell reference signal, a time domain cell broadcasting weight or a CDD weight and a time domain AC related weight.

The step that power weighting processing is performed on the PSS time domain sequences to obtain the weighted PSS time domain sequences according to the pre-stored PSS time domain sequences with different sampling rates and different $N_{ID}^{(2)}$ configurations and the PSS time domain power weighting related parameter specifically includes that:

complex multiplication operation is performed on the pre-stored PSS time domain sequences with different sampling rates and different $N_{ID}^{(2)}$ configurations and the PSS time domain power weighting related parameter to implement power weighting processing of the PSS time domain sequences to further obtain a power weighted PSS time domain sequence with a current cell configuration.

At Step 303, addition operation is performed on the weighted PSS time domain sequences and time domain data of other signals and channels except the PSS.

Here, before addition operation is performed on the weighted PSS time domain sequences and the time domain data of the other signal and channel except the PSS, the method further includes that: mapping and IFFT are performed on the other signals and channels except the PSS in the downlink of LTE to obtain the time domain data of the other signals and channels except the PSS.

The step that addition operation is performed on the weighted PSS time domain sequences and the time domain data of the other signals and channels except the PSS specifically includes that:

complex addition operation is performed on power weighted PSS time domain data and the time domain data of the other signals and channels except the PSS on a symbol with a PSS mapping requirement to obtain processed time domain data.

Figure 3:
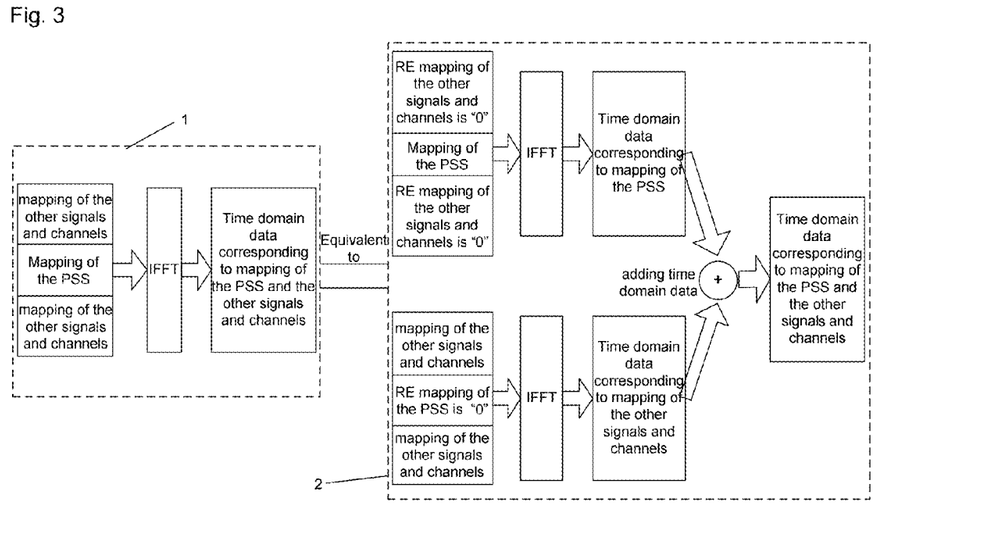
FIG. 3 is an equivalent block diagram illustrating implementation of a PSS in the frequency/time domains according to an embodiment of the disclosure.

In the embodiments of the disclosure, the two approaches for implementing RE mapping and frequency/time domain conversion on a specified symbol are equivalent. FIG. 3 is an equivalent block diagram illustrating implementation of a PSS in the frequency/time domains according to an embodiment of the disclosure. As shown in FIG. 3, it is indicated that process 1 of implementing a PSS in the frequency domain in the conventional art is equivalent to process 2 of implementing the PSS in the frequency domain in the embodiments of the disclosure. However, the embodiments of the disclosure avoid time overhead generated by frequency domain PSS RE mapping on the premise of ensuring realizing all of PSS related functions, and further remarkably improve processing efficiency of an LTE downlink physical layer link.

The embodiments of the disclosure further provide a computer storage medium having computer-executable instructions stored therein, wherein the computer-executable instructions are configured to execute the method for implementing the PSS in the time domain according to the embodiments of the disclosure.

Figure 4:
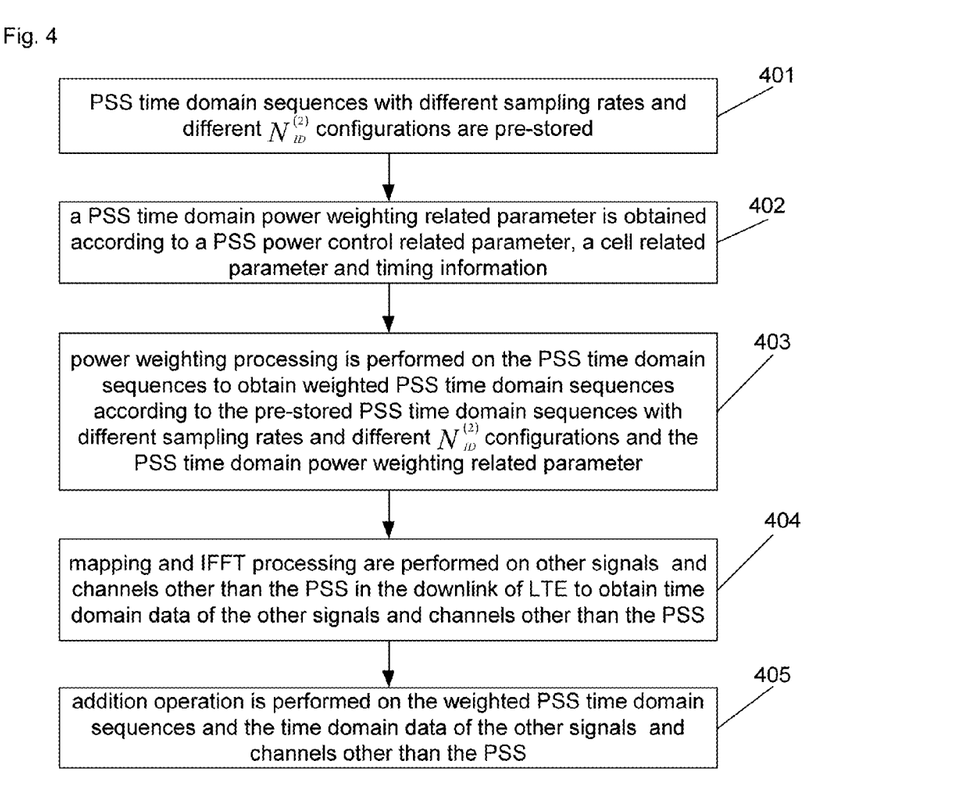
FIG. 4 is a flowchart showing a method for implementing a PSS in the time domain according to an embodiment of the disclosure.

FIG. 4 is a flowchart showing a method for implementing a PSS in the time domain according to an embodiment of the disclosure. As shown in FIG. 4, a flow of the method for implementing the PSS in the time domain includes the following steps.

At Step 401, PSS time domain sequences with different sampling rates and different $N_{ID}^{(2)}$ configurations are pre-stored.

Here, the step that the PSS time domain sequences with different sampling rates and different $N_{ID}^{(2)}$ configurations are pre-stored specifically includes that:

PSS frequency domain sequences with different $N_{ID}^{(2)}$ configurations are obtained in advance, and IFFT processing with different sampling rates is performed on the PSS frequency domain sequences to further obtain the PSS time domain sequences with different sampling rates and different $N_{ID}^{(2)}$ configurations.

Here, the step that the PSS time domain sequences with different $N_{ID}^{(2)}$ configurations are obtained in advance specifically includes that:

the PSS frequency domain sequences are obtained by adopting a PSS generation formula of an LTE physical layer protocol, wherein the PSS generation formula of the LTE physical layer protocol meets the following expression:

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases},$$

where a value range of $N_{ID}^{(2)}$ is $\{0, 1, 2\}$, a value of u is 25 when a value of $N_{ID}^{(2)}$ is 0, the value of u is 29 when the value of $N_{ID}^{(2)}$ is 1, and the value of u is 34 when the value of $N_{ID}^{(2)}$ is 2.

Alternatively, the PSS frequency domain sequences are obtained by adopting a PSS frequency domain sequence generation formula which does not exclude a direct current component corresponding to a zero frequency, wherein the PSS frequency domain sequence generation formula which does not exclude the direct current component corresponding to the zero frequency meets the following expression:

$$d_u(n) = e^{-j\frac{\pi u n(n+1)}{63}} \quad n = 0, 1, 2, \ldots, 31, \ldots, 62,$$

where the value range of $N_{ID}^{(2)}$ is $\{0, 1, 2\}$, the value of u is 25 when the value of $N_{ID}^{(2)}$ is 0, the value of u is 29 when the value of $N_{ID}^{(2)}$ is 1, and the value of u is 34 when the value of $N_{ID}^{(2)}$ is 2.

Here, since a PSS sequence generation rule of the LTE physical layer protocol does not include the direct current component corresponding to the zero frequency of an LTE frequency spectrum, i.e. the following sampling point:

$$d_u(n) = e^{-j\frac{\pi u n(n+1)}{63}} n = 31.$$

It is confirmed by algorithm simulation that influence of addition of the direct current component corresponding to the zero frequency to the PSS frequency domain sequences on performance of the PSS is slight and almost negligible, so that when the direct current component corresponding to the zero frequency is added, that is, when a sampling point under the condition of n=31 is added into the PSS generation formula of the LTE physical layer protocol, the corresponding PSS sequence generation formula may also be optimized into formula:

$$d_u(n) = e^{-j\frac{\pi u n(n+1)}{63}} \quad n = 0, 1, 2, \ldots, 31, \ldots, 62.$$

At Step 402, a PSS time domain power weighting related parameter is obtained according to a PSS power control related parameter, a cell related parameter and timing information.

Here, the PSS time domain power weighting related parameter includes: cell reference signal power, power offset of the PSS relative to a cell reference signal, a time domain cell broadcasting weight or a CDD weight and a time domain AC related weight.

At Step 403, power weighting processing is performed on the PSS time domain sequences to obtain weighted PSS time domain sequences according to the pre-stored PSS time domain sequences with different sampling rates and different $N_{ID}^{(2)}$ configurations and the PSS time domain power weighting related parameter.

Here, the step that power weighting processing is performed on the PSS time domain sequences to obtain the weighted PSS time domain sequences according to the pre-stored PSS time domain sequences with different sampling rates and different $N_{ID}^{(2)}$ configurations and the PSS time domain power weighting related parameter specifically includes that:

complex multiplication operation is performed on the pre-stored PSS time domain sequences with different sampling rates and different $N_{ID}^{(2)}$ configurations and the PSS time domain power weighting related parameter to implement power weighting processing of the PSS time domain sequences to further obtain a power weighted PSS time domain sequence with a current cell configuration.

At Step 404, mapping and IFFT processing is performed on the other signals and channels except the PSS in the downlink of LTE to obtain time domain data of the other signals and channels except the PSS.

At Step 405, addition operation is performed on the weighted PSS time domain sequences and the time domain data of the other signals and channels except the PSS.

Here, the step that addition operation is performed on the weighted PSS time domain sequences and the time domain data of the other signals and channels except the PSS specifically includes that:

complex addition operation is performed on power weighted PSS time domain data and the time domain data of the other signals and channels except the PSS on a symbol with a PSS mapping requirement to obtain processed time domain data.

The embodiments of the disclosure further provide a computer storage medium having computer-executable instructions stored therein, wherein the computer-executable instructions are configured to execute the method for implementing the PSS in the time domain according to the embodiments of the disclosure.

Figure 5:
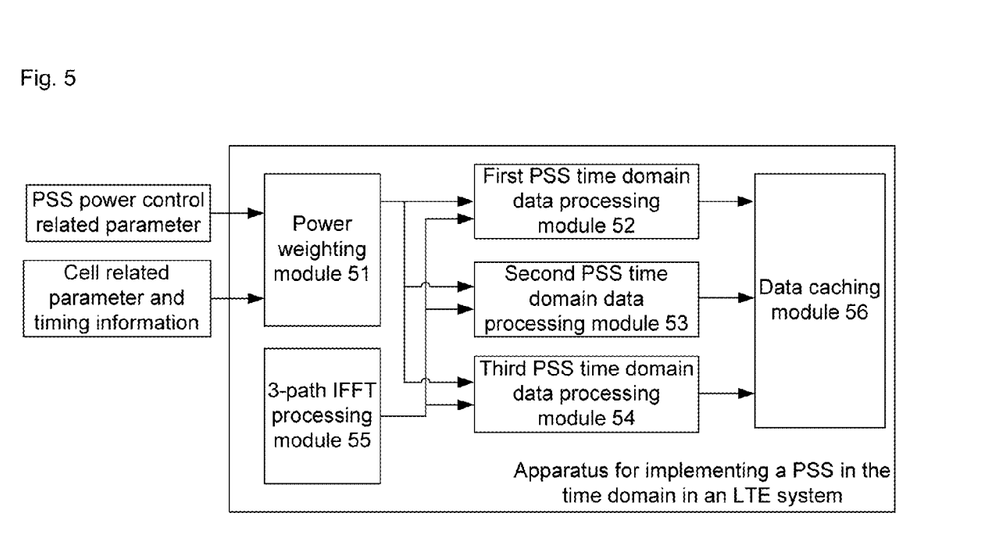
FIG. 5 is a structure diagram illustrating an apparatus for implementing a PSS in the time domain according to an embodiment of the disclosure.

FIG. 5 is a structure diagram illustrating an apparatus for implementing a PSS in the time domain according to an embodiment of the disclosure. As shown in FIG. 5, the apparatus for implementing the PSS in the time domain includes: a power weighting module 51 and at least one PSS time domain data processing module. In the embodiment, there are three PSS time domain data processing modules, specifically including: a first PSS time domain data processing module 52, a second PSS time domain data processing module 53 and a third PSS time domain data processing module 54.

The power weighting module 51 is configured to obtain a PSS time domain power weighting related parameter according to a PSS power control related parameter, a cell related parameter and timing information, and send the PSS time domain power weighting related parameter to the first PSS time domain data processing module 52, the second PSS time domain data processing module 53 and the third PSS time domain data processing module 54.

Here, the PSS time domain power weighting related parameter includes: cell reference signal power, power offset of the PSS relative to a cell reference signal, a time domain cell broadcasting weight or a CDD weight and a time domain AC related weight.

All of the first PSS time domain data processing module 52, the second PSS time domain data processing module 53 and the third PSS time domain data processing module 54 are configured to pre-store PSS time domain sequences with different sampling rates and different $N_{ID}^{(2)}$ configurations, perform power weighting processing on the PSS time domain sequences to obtain weighted PSS time domain sequences according to the pre-stored PSS time domain sequences with different sampling rates and different $N_{ID}^{(2)}$ configurations and the PSS time domain power weighting related parameter, and sum up the weighted PSS time domain sequences and time domain data of other signals and channels except the PSS to obtain processed time domain data.

Preferably, the apparatus for implementing the PSS in the time domain further includes an n-path IFFT processing module and a data caching module 56. Specifically, the n-path IFFT processing module in the embodiment is a three-path IFFT processing module 55.

The three-path IFFT processing module 55 is configured to obtain the time domain data of the other signals and channels except the PSS, and send the time domain data of the other signals other than the PSS to the first PSS time domain data processing module 53, the second PSS time domain data processing module 54 and the third PSS time domain data processing module 55.

The data caching module 56 is configured to receive the processed time domain data sent by the PSS time domain data processing module, and cache the processed time domain data by taking a symbol as a unit.

Here, the first PSS time domain data processing module 52, the second PSS time domain data processing module 53 and the third PSS time domain data processing module 54 correspond to 3 channels 0, 1 and 2 of the three-path IFFT processing module 55 respectively.

Here, the data caching module 56 may be a RAM.

During a practical application, the apparatus for implementing the PSS in the time domain in an LTE system may include at least one PSS time domain data processing module, the PSS time domain data processing modules have the same functions. There are only three PSS time domain data processing modules shown in the embodiment of the disclosure.

Correspondingly, the 3-path IFFT processing module may be an n-path IFFT processing module during a practical application, wherein n is the number of channels, n≥1 and n is a positive integer; and a value of n is the same as the number of the PSS time domain data processing modules of the apparatus for implementing the PSS in the time domain in the LTE system.

In the embodiment of the disclosure, functions of each of the processing modules in the apparatus for implementing the PSS in the time domain in the LTE system may be realized by a program running on a processor, and may also be realized by a specific logic circuit, for example, a Central Processing Unit (CPU), Micro Processing Unit (MPU), Digital Signal Processor (DSP) or Field-Programmable Gate Array (FPGA) in an Evolved Node B (eNodeB) where the apparatus for implementing the PSS in the time domain in the LTE system is located. The data caching module may also be implemented by various memories or storage media.

Those skilled in the art should know that the embodiments of the disclosure may be provided as a method, a system or a computer program product. Therefore, the disclosure may adopt pure hardware, pure software and combination thereof. Moreover, the disclosure may adopt a computer program product implemented on one or more computer-available storage media (including, but not limited to, a disk memory and an optical memory) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that an apparatus for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction apparatus may be generated by the instructions stored in the computer-readable memory, the instruction apparatus realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the embodiments of the disclosure, and it is noted that those skilled in the art may also make various improvements and embellishments without departing from the principle of the embodiment of the disclosure and these improvements and embellishments shall also be considered to fall within the scope of protection of the embodiment of the disclosure.

INDUSTRIAL APPLICABILITY

According to the embodiments of the disclosure, frequency/time domain conversion of a symbol which completes frequency domain RE mapping of the PSS and mapping of the other signals and channels may be implemented by IFFT processing to further obtain time domain data corresponding to the symbol; and RE mapping and IFFT processing are performed on the PSS and the data of the other signals and channels except the PSS to obtain two sets of time domain data respectively. Therefore, the embodiments of the disclosure avoid time overhead generated by frequency domain PSS RE mapping on the premise of ensuring realizing all of PSS related functions, and further remarkably improves processing efficiency of an LTE downlink physical layer link.

The invention claimed is:
1. A method for implementing a Primary Synchronization Signal (PSS) in a time domain, pre-storing PSS time domain sequences with different sampling rates and different $N_{ID}^{(2)}$ configurations, wherein the method further comprises:
obtaining a PSS time domain power weighting related parameter according to a PSS power control related parameter, a cell related parameter and timing information;
performing power weighting processing on the pre-stored PSS time domain sequences with different sampling rates and different $N_{ID}^{(2)}$ configurations to obtain weighted PSS time domain sequences according to the pre-stored PSS time domain sequences with different sampling rates and different $N_{ID}^{(2)}$ configurations and the PSS time domain power weighting related parameter; and
performing addition operation on the weighted PSS time domain sequences and time domain data of signals and channels except the PSS to obtain processed time domain data.

2. The method according to claim 1, wherein the step of pre-storing the PSS time domain sequences with different sampling rates and different $N_{ID}^{(2)}$ configurations comprises:
obtaining PSS frequency domain sequences with different $N_{ID}^{(2)}$ configurations in advance, and performing Inverse Fast Fourier Transform (IFFT) processing with different sampling rates on the PSS frequency domain sequences to obtain and store the PSS time domain sequences with different sampling rates and different $N_{ID}^{(2)}$ configurations.

3. The method according to claim 2, wherein the step of obtaining the PSS frequency domain sequences with different $N_{ID}^{(2)}$ configurations in advance comprises:
obtaining the PSS frequency domain sequences by using a PSS generation formula in a Long Term Evolution (LTE) physical layer protocol, wherein the PSS generation formula in the LTE physical layer protocol meets the following expression:

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases},$$

where a value of $N_{ID}^{(2)}$ is selected from $\{0, 1, 2\}$, a value of u is 25 when a value of $N_{ID}^{(2)}$ is 0, the value of u is 29 when the value of $N_{ID}^{(2)}$ is 1, and the value of u is 34 when the value of $N_{ID}^{(2)}$ is 2; or,
obtaining the PSS frequency domain sequences by using a PSS frequency domain sequence generation formula which does not exclude a direct current component corresponding to a zero frequency, wherein the PSS frequency domain sequence generation formula which does not exclude the direct current component corresponding to the zero frequency meets the following expression:

$$d_u(n) = e^{-j\frac{\pi u n(n+1)}{63}} \quad n = 0, 1, 2, \ldots, 31, \ldots, 62,$$

where the value of $N_{ID}^{(2)}$ is selected from $\{0, 1, 2\}$, the value of u is 25 when the value of $N_{ID}^{(2)}$ is 0, the value of u is 29 when the value of $N_{ID}^{(2)}$ is 1, and the value of u is 34 when the value of $N_{ID}^{(2)}$ is 2.

4. The method according to claim 1, wherein the PSS time domain power weighting related parameter comprises: cell reference signal power, power offset of the PSS relative to a cell reference signal, a time domain cell broadcasting weight or a Cyclic Delay Diversity (CDD) weight and a time domain Antenna Calibration (AC) related weight.

5. An apparatus for implementing a Primary Synchronization Signal (PSS) in a time domain, comprising: a power weighting module and at least one PSS time domain data processing module, wherein the power weighting module is configured to obtain a PSS time domain power weighting related parameter according to a PSS power control related parameter, a cell related parameter and timing information, and send the PSS time domain power weighting related parameter to the at least one PSS time domain data processing module; and the at least one PSS time domain data processing module is configured to pre-store PSS time domain sequences with different sampling rates and different $N_{ID}^{(2)}$ configurations, perform power weighting processing on the PSS time domain sequences to obtain weighted PSS time domain sequences according to the pre-stored PSS time domain sequences with different sampling rates and different $N_{ID}^{(2)}$ configurations and the PSS time domain power weighting related parameter, and perform addition operation on the weighted PSS time domain sequences and time domain data of signals and channels except the PSS to obtain processed time domain data.

6. The apparatus according to claim 5, further comprising an n-path Inverse Fast Fourier Transform (IFFT) processing module and a data caching module, wherein the n-path IFFT processing module is configured to obtain the time domain data of the signals and channels except the PSS, and send the time domain data of the signals to the at least one PSS time domain data processing module; and the data caching module is configured to receive the processed time domain data sent by the at least one PSS time domain data processing module, and cache the processed time domain data by taking a symbol as a unit.

7. The apparatus according to claim 6, wherein the data caching module is a Random Access Memory (RAM).

8. The apparatus according to claim 5, wherein the PSS time domain power weighting related parameter comprises: cell reference signal power, power offset of the PSS relative to a cell reference signal, a time domain cell broadcasting weight or a Cyclic Delay Diversity (CDD) weight and a time domain Antenna Calibration (CA) related weight.

9. A non-transitory computer storage medium having computer-executable instructions stored therein, wherein the computer-executable instructions are configured to execute a method for implementing the Primary Synchronization Signal (PSS) in a time domain, wherein the method comprises:

pre-storing PSS time domain sequences with different sampling rates and different $N_{ID}^{(2)}$ configurations;

obtaining a PSS time domain power weighting related parameter according to a PSS power control related parameter, a cell related parameter and timing information;

performing power weighting processing on the pre-stored PSS time domain sequences with different sampling rates and different $N_{ID}^{(2)}$ configurations to obtain weighted PSS time domain sequences according to the pre-stored PSS time domain sequences with different sampling rates and different $N_{ID}^{(2)}$ configurations and the PSS time domain power weighting related parameter; and performing addition operation on the weighted PSS time domain sequences and time domain data of signals and channels except the PSS to obtain processed time domain data.

10. The method according to claim 2, wherein the PSS time domain power weighting related parameter comprises: cell reference signal power, power offset of the PSS relative to a cell reference signal, a time domain cell broadcasting weight or a Cyclic Delay Diversity (CDD) weight and a time domain Antenna Calibration (AC) related weight.

11. The apparatus according to claim 6, wherein the PSS time domain power weighting related parameter comprises: cell reference signal power, power offset of the PSS relative to a cell reference signal, a time domain cell broadcasting weight or a Cyclic Delay Diversity (CDD) weight and a time domain Antenna Calibration (CA) related weight.

* * * * *